United States Patent [19]
Sjöstrom et al.

[11] Patent Number: 5,208,286
[45] Date of Patent: May 4, 1993

[54] CROSS-LINKABLE ETHYLENE-VINYL ALCOHOL-ACRYLATE POLYMER AND METHOD OF PRODUCING THE SAME

[75] Inventors: Hakan Sjöstrom, Porvoo; Kenneth Ekman, Kaarina; Veijo Turpeinen, Porvoo; Kirsi Pulliainen, Kulloo, all of Finland

[73] Assignee: Neste Oy, Finland

[21] Appl. No.: 628,855

[22] Filed: Dec. 14, 1990

[30] Foreign Application Priority Data

Dec. 18, 1989 [FI] Finland .................................. 896054

[51] Int. Cl.$^5$ .......................... C08G 63/46; C08F 8/14
[52] U.S. Cl. ........................................ 525/57; 525/60; 525/61
[58] Field of Search ..................... 525/60, 61, 57, 59

[56] References Cited

U.S. PATENT DOCUMENTS 4,228,250  10/1980  Pritchett ............................... 525/57

Primary Examiner—Joseph L. Schofer
Assistant Examiner—Jeffrey T. Smith
Attorney, Agent, or Firm—Steinberg & Raskin

[57] ABSTRACT

The invention relates to polyethylene co- or ter-polymers that are cross-linkable. The polymers contain unsaturated acrylate bonds as a result of which the polymer can be efficiently cross-linked by ionizing radiation or chemically by means of peroxides.

6 Claims, 6 Drawing Sheets

CROSS-LINKABLE ETHYLENE-VINYL ALCOHOL-ACRYLATE POLYMER AND METHOD OF PRODUCING THE SAME

BACKGROUND OF THE INVENTION

Polyethylene can be cross-linked in a number of different ways, the modes most commonly used being peroxide cross-linking, radiation cross-linking, or silane cross-linking. In both radiation and peroxide cross-linking, the cross-linking is a radical reaction. As a result of irradiation, or decomposition of peroxides, radicals are formed in the polymer chains. When these radicals are combined, covalent bonds, so called cross-links, are formed between the polymer chains. In silane cross-linking silanol groups react with each other and form cross-links.

In peroxide cross-linking, polyethylene is first blended with peroxides and with additives, whereupon the mixture is extruded, for example, to make cables or pipes. The cross-linking takes place in the molten state at about 300.C, generally under nitrogen atmosphere after extrusion at higher temperature in a so-called vulcanizing line. The peroxides are decomposed at high temperature and form radicals, which produce radicals in the polymer chains. When polymer radicals are combined, a covalent bond is formed between two molecules. After a sufficiently high number of bonds, the polymer becomes insoluble. The degree of cross-linkage is usually measured by means of solution extraction in accordance with ATSM D2765 standard.

Radiation cross-linking takes place at room temperature after extrusion, as a rule in a separate step. By means of radiation, only amorphous parts of a polymer can be cross-linked. Radiation has very little effect on crystalline parts of a polymer. Thus, a low-density polyethylene is easier to cross-link than a high density polyethylene. As a source of radiation, electron accelerators or a source of gamma radiation are usually used. The energy of an electron accelerator suitable for cross-linking applications varies in the range of 500 keV to 10 MeV, and the output in the range of 10-20 KW. Electron radiation has a lower depth of penetration than does gamma radiation with the same radiation energy. It is for this reason that gamma radiation is used for radiation cross-linking of large pieces. Gamma radiation is derived from radioactive isotopes, for example $^{50}$Co or $^{137}$Cs, or it can be produced by means of an electron accelerator by directing the electron beam, e.g. at a tugsten target, whereby bremsstrahlung is produced. In both cases, the source of gamma radiation has a considerably lower absorbed dose rate than does an electron accelerator. Cross-linking of cables by means of an electron accelerator usually takes only a few seconds.

Polyethylene can be grafted with vinylsilanes, and from this graft copolymer a product can be prepared immediately or later on. Afterwards, the product can be cross-linked with water vapor (monosil and Sioplas techniques). The above technique is also employed for cross-linking of ethylene-vinylsilane copolymers. In order to enhance the cross-linking, a catalyst is usually used. For example, tin dibutyl-dilaurate. Silane cross-linking is slow, the reaction speed depends on the diffusion of the water vapor in the polymer. Thus, silane cross-linking is best suitable for products which have a thin wall, for example low-voltage cables.

The resistance to heat and the maximum use temperature of polyethylene can be increased by cross-linking. At high temperatures, for example above the crystalline melting point of polyethylene, a polyethylene that has not been cross-linked flows, whereas a cross-linked polymer retains its shape because the polymer chains cannot move in relation to each other. Thus, a cross-linked polyethylene object retains its shape better than an object that has not been cross-linked. Irrespective of the method of cross-linking, the mechanical strength of a polymer at high temperature is improved.

In other applications, cross-linking is necessary in order to be able to use polyethylene, LDPE (low-density polyethylene) can be used constantly at a maximum temperature of 70° C. and momentarily at 90° C. Cross-linked polyethylene can be used constantly at 90° C. and momentarily even at 250° C. Other polyethylene types, such as HDPE (high-density polyethylene) withstand heat better than LDPE, because of higher melting point (density and crystalline). Cross-linking permits the use of polyethylene within a wide temperature range, which is important in many applications, such as cable or hot water piping applications. In cross-linking of insulation layers for cables and hot water pipes it is very important that a sufficiently high degree of cross-linking is achieved in order to achieve a sufficient resistance to heat. Measured by means of solution extraction in accordance with the ASTM D 2765 standard, as a rule, a degree of cross-linking higher than 70% is required for cable and pipe applications. (Roberts B. E., and S. Verne, Plastics and Rubber Processing and Applications 4 (1984), pp 135-139).

Cross-linked polyethylene can also be used for shrink applications. The polymer is extruded and cross-linked after which the product is stretched and cooled. The product cools in the stretched form, and on heating the product is restored to the same shape that it had before stretching. In this way, it is possible to prepare shrink-wrap film, pipes and joints. The shrinkage of a material that has not been cross-linked depends mainly on the orientation obtained by the polymer during extrusion. Cross-linking permits easy control of the shrinking quality; moreover, the shrinking force of a cross-linked polymer is high as compared with a polymer not cross-linked. Shrink applications, such as shrinkwrap film, shrink bag or different types of joints, usually require a lower degree of cross-linking, as a rule about 30-50%.

Cross-linked polyethylene can also be utilized in the production of foam plastic. The polyethylene, the foaming agent, and the additives are extruded and cross-linked. The cross-linked polymer is foamed, whereby the polymer cools to the stretched form. An advantage of cross-linked polyethylene foam is smaller and more uniform cell size and, consequently, improved mechanical properties.

If a polymer has a high molar mass, an increase is obtained in the mechanical properties of the polymer, such as its tenacity, tensile strength, and resistance to heat. A polymer with a higher molar mass can be cross-linked more readily, because fewer cross-links are required to make the polymer insoluble. Thus, a polyethylene that can be cross-linked readily has a higher molar mass. On the other hand, the quality of working of a polymer deteriorates decisively when the molar mass of the polymeris increased. The melt index of polyethylene is measured by means of the method of the ASTM D-1238 standard at 190° C. The melt index gives a picture of the fluidity, and consequently also of the workability and of the molar mass of the polymer.

In the cross-linking, a gel dose means a radiation dose that is required to form one cross-link per molecule. With this radiation dose the polymer becomes insoluble since all the polymer chains are linked with each other. In practice, the cross-linking takes place in a random way, thus, first a part of the polymer is not dissolved and, when the radiation dose becomes larger, the gel concentration increases (Bradley R., Radiation Technology Handbook, Marcel Dekker Inc. 1984).

The polyethylene copolymers ethene-vinylacetate (EVA), ethylene-buylacrylate (EBA), ethylene-methylacrylate (EMA), or ethylene-ethylacrylate-copolymer (EEA) are softer and more elastic materials than polyethylene. Thus, being not cross-linked, these copolymers also have an inferior resistance to heat, as compared with polyethylene. Depending on the amount of comonomers, the copolymers are more amorphous than polyethylene. As a rule, the concentration of comonomers is about 1–30% by weight. Owing to their lower crystallinity, copolymers are cross-linked about 5–15% better than LDPE (polyethylene). Owing to their lower melting point and softening point, copolymers must, as a rule, be cross-linked to a higher extent than polyethylene in order to achieve the same mechanical strength as LDPE (polyethylene) at a temperature of 100°–130° C. At higher temperatures (>150° C.), the mechanical strength depends mainly on the degree of cross-linking. A low-density polyethylene whose melt index is 5–10 g/10 min, measured with a weight of 2.16 kg, requires a radiation dose of about 200–300 kGy to reach a cross-linking degree of 60%. LDPE requires approximately the same dose. However, HDPE requires a higher dose, 250–350 kGy. EVA, EBA and other acrylate copolymers are cross-linked a little better and reach a cross-linking degree of 60% with a dose of about 150–250 kGy. These values are guide values for qualities that have a melt index of 3–10 g/10 min.

Ethylene-vinylalcohol-copolymer is very difficult to cross-link with peroxides or by electron radiation.

By copolymerization of ethylene and diens, it is possible to prepare polymers that contain double bonds. Many polyethylene qualities and ethylene-propylene rubbers that can be cross-linked are copolymers or ter-polymers of ethylene and a diene. These polymers are usually prepared by means of coordination polymerization. In many cases, 1,4-hexadiene has been used as a comonomer. Other dienes that have been commonly used as a comonomer are, for example, 5-methyl-1-4,hexadiene, 4-methyl-1,4-hexadiene, 1,6-octadiene, cyclohexadiene, dicyclopentadiene, or 5-ethylidene-2-norbornene (JP 59106946-A, JP 57098534-A, JP 570599333-A).

Polyethylene copolymers that contain double bonds are cross-linked with peroxides as much as 50% better than saturated polyethylenes prepared by means of a corresponding catalyst. By radiation, these unsaturated polymer qualities are cross-linked only slightly better than corresponding saturated polymer qualities.

It is well known that an acrylate double bond reacts particularly sensitively to radiation or peroxide. Most lacquers and paints hardening by means of ultraviolet light (UV) or electron radiation are based on acrylated epoxy, urethane or polyester oligomers. As a rule, these oligomers contain 3 to 50 acrylate double bonds. To harden these oligomers, a radiation dose of 10–30 kGy is enough for substantially complete polymerization. Oligomers have a relatively high viscosity, for which reason the paints and lacquers are mixtures of oligomers and monomers. The monomers that are used most commonly are hexane-diol-diacrylate (HDDA), tripropyleneglycol-diacrylate (TPGDA), trimethylolpropanetriacrylate (TMPTA), or n-vinylpyrrolidone (NVP) (Holman R., YV & EB Curing Formulations For Printing Inks, Coatings & Paints, SITA Technology 1984).

It is known in the prior art that it is possible to improve the cross-linking quality of polymers by blending them with multi-functional acrylate monomers. In such case, 1–10% by weight of mono-, di- or tri-functional acrylate monomers of allyl monomers have been used, such as tetraethyleneglycol-diacrylate (TEGDMA), trimethylolpropane-trimethacrylate (TMPTMA), or triallylcyanurate (TAC), note, DE 1544804-B.

Polyethyleneacrylate monomer mixtures, however, involve the problem that it is difficult to disperse a polar monomer in a non-polar matrix plastic. Acrylate and allyl monomers that are blended in polyethylene tend to be carried out of the matrix plastic and to gather on the surface, causing so-called sweating. Owing to the sweating, the object must be cross-linked as soon as possible after extrusion. In the stage of cross-linking, the monomers are polymerized as a homopolymer of the acrylate of allyl monomers concerned. Thus, monomers that are capable of forming bonds between the different polymer chains in the matrix plastic are present only at the boundary face between the monomer phase and the matrix plastic.

SUMMARY OF THE INVENTION

The present invention relates to polyethylene acrylate co- or ter-polymers that can be cross-linked and that contain acrylate groups having double bonds.

The invention further relates to a method of producing polyethylene acrylate co- or ter-polymers that can be cross-linked and that contain acrylate groups having double bonds.

Still further, the present invention relates to polyethylene-vinyl alcohol-acrylate co- or ter-polymers that are prepared by means of after-modification and which have acrylate groups having double bonds in the side chains which improve the cross-linking by radiation or by chemical cross-linking.

It is accordingly a primary object of the present invention to provide ethylene co- or ter-polymers which are based on chemically bound acrylate groups contained therein, which are more readily cross-linked than prior art polyethylene-acrylate comonomers, but which nevertheless have similar mechanical properties while avoiding the problems of polyethylene-acrylate monomer mixtures.

It is a further object of the present invention to improve the cross-linking quality of ethylene-vinyl alcohol-copolymers.

With the above and other objects in view, the present invention mainly comprises, polyethylene acrylate co- or ter-polymers which are cross-linkable and which contain unsaturated acrylate groups, as a result of which the polymer can be efficiently cross-linked either by ionizing radiation or chemically by means of peroxides.

In accordance with the further object of the present invention, the process is characterized in that the ethylene-vinyl alcohol-copolymer is esterified with an unsaturated organic carboxylic acid.

The reactivity of acrylates on irradiation is based thereon that at the proximity of the double bond there is an acceptor group, in the present case an ester bond (Fleming I. Frontier Orbitals and Organic Chemical Reactions, John Wiley & Sons Ltd. 1976).

The present invention differs from the prior art in the respect that in accordance with the present invention, it is possible to prepare a copolymer whose mechanical properties, when the copolymer has not been cross-linked, resemble other known polyethylene copolymers, for example EVA or EBA. However, the difference is that the polymer in accordance with the invention can be cross-linked very easily by means of ionizing radiation or by means of peroxides. The polymer in accordance with the invention differs from the prior art ethylene acrylate copolymers in the respect that it is both unsaturated and it contains acrylate double bonds.

The polymer is prepared by esterification of an ethylene-vinylalcohol-copolymer (EVOH) with a carboxylic acid, for example acrylic acid. In this way, an ethylene copolymer is prepared wherein a double bond is at the proximity of an ester bond, i.e. in the same chain branch. The structure of the side chain of the polymer is illustrated in Formula (I) below. The acceptor group, in this case the ester bond, and the double bond may be isolated from one another by means of A, which may be a hydrocarbon, of a length of 0–10 C-atoms. Thus, the reactivity can be regulated by selection of the length of the carboxylic acid. The highest reactivity of the ionizing radiation is obtained with acrylic acid, in which case A is zero so that the ester bond and the double bond are not separated by A. R is a hydrocarbon or hydrogen substituent, for example a lower or higher alkyl, aromatic $CH_3$, $—C_2H_5$, phenyl, or some other lower or higher hydrocarbon.

The polymer is prepared by esterification of an ethylene-vinylalcohol-copolymer (EVOH) whose vinylalcohol concentration is 1–100% by weight with an unsaturated organic acid, for example acrylic acid, methacrylic acid, or allylacetic acid. The esterification can be carried out either in an acid solution or by means of reactive processing in the molten state. A catalyst may be used to accelerate the reaction.

The starting material of the polymer that can be cross-linked, EVOH, which can be prepared from ethylene-vinylacetate copolymer (EVA), for example, by means of alkaline hydrolysis in the molten state. In the hydrolysis, the vinylacetate group is split into vinylalcohol and acetic acid by means of, for example, sodium methoxide and alcohol. The polymer prepared in this way is a terpolymer which consists of ethylene, vinylacetate and vinylalcohol. Moreover, the degree of hydrolyzation of the polymer can be easily regulated by altering the temperature of the extruder or the time of dwell of the polymer. Thus, by means of two-stage reactive processing, it is advantageously possible to prepare ethylene acrylate polymers that can be readily cross-linked.

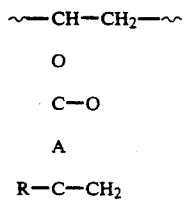

Formula (I)

Structure of Side Chain

The polymer can be cross-linked by means of radiation considerably more readily than saturated polyethylene-acrylate copolymers or ethylene-diene co and terpolymers. The improved cross-linkage occurs particulary well with small radiation does, doses of 10–30 kGy. The degree of cross-linkage is mainly dependent on the number of acrylate side chains so that the higher the number of acrylate-double-bond side chains, the higher the degree of cross-linkage that is achieved. The dependence of the degree of cross-linkage on the amount of acrylic acid added is illustrated in FIG. 4. Most of the acrylate double bonds react with a dose lower than 50 kGy and with radiation doses higher than 50 kGy, the polymer is cross-linked in the same way as a non-esterified product.

To establish the structure of the esterified polymer, a Fourier Transform infrared spectrometer (FTIR) as well as a nuclear magnetic resonance spectrometer (NMR) have been used. Moreover, scanning calorimetry (DSC) has been employed to establish the melting point and crystallinity of the polymer.

EVOH in itself is very difficult to cross-link by means of peroxides or radiation. When EVOH is esterified with acrylic acid in accordance with the invention, it is thus possible to prepare an EVOH that can be cross-linked. The melt index of the esterified polymer depends on the melt index of the EVOH. Esterification in the molten state raises the melt index by about 0–10% depending on the amount of acrylic acid added.

The polymer in accordance with the invention can be used, e.g. for the following applications:
Cable or pipe applications wherein a high degree of cross-linkage is required.
The material can be used for shrink applications or for production of foam plastic.
The polymer can also be used in combination products that contain some component readily degraded by radiation, for example, for coating of paper. Cross-linking by radiation can improve the heat resistance of the coating. Owing to the good cross-linking property of the polymer, the paper is not degraded by irradiation.
The polymer can be used for applications to be colored or painted, wherein chemical bonds may be formed between the polymer and the paint layer whereby the adhesion is improved.

The rheological properties of the polymer depend on the rheological properties of the ethylene-vinylacetate copolymer used for the preparation of the EVOH. Thus, by means of the choice of the EVOH, it is possible to prepare a polymer that can be cross-linked and that is suitable for different processing methods.

The polymer can be processed by prior art means intended by thermoplastics such as, for example, extrusion moulding, injection moulding, compression moulding, film blowing, extrusion coating processes.

The degree of cross-linkage obtained in cross-linking by radiation depends on the radiation dose and on the conversion in esterification. The degree of cross-linkage obtained in cross-linking by means of peroxides depends on the amount of peroxide added, on the temperature, on the cross-linking time, and on the conversion in esterification. The amount of acrylic double bonds esterified into the polymer, i.e. the conversion in esterification, is the most important parameter that affects the cross-linking.

BRIEF DESCRIPTION OF THE DRAWINGS

The drawings in this case are graphic illustrations of degrees of cross-linking obtained in accordance with the present invention.

DESCRIPTION OF PREFERRED EMBODIMENTS

The following examples are given to further illustrate the present invention. The scope of the invention is not, however, meant to be limited to the specific details of the examples:

EXAMPLE 1

Preparation of Polymer

1. The esterification was carried out in the molten state by means of a Brabender Plasticorder mixer. The raw-material used was ethylene-vinylalcohol copolymer (BAYER Levasint S-31) which was esterified with a stoichiometric amount of methacrylic acid. The conditions were 150° C., 50 rpm speed of rotation, and dwell time of 10 minutes.

2. The same procedure was followed as under 1, except that acrylic acid was used instead of methacrylic acid. The temperature during the mixing was 190° C., a speed of rotation of 50 rpm was used, and the duration of the mixing was five minutes. The melt index of the polymer was higher than 30 g/10 min, measured with a weight of 2.16 kg.

3. The same procedure was followed as under 1, except that the mixing was carried out at 180° C. for 30 minutes. The melt index of the polymer was higher than 30 g/10 min.

Cross-linking by Radiation

4. From the polymer prepared under 1, a 0.1 mm thick film was prepared by compression moulding. The compression time was 5 min, the temperature 150° C., and the pressure 100 bars.

5. A sample piece was cross-linked by radiation using an Electrocurtain Lab-Unit electron accelerator of Energy Sciences Inc. The sample pieces were irradiated with 175 keV electrons with radiation doses of 10, 30, 50 and 100 kGy in nitrogen atmosphere with an oxygen content of about 120-150 ppm $O_2$.

Figure 1:
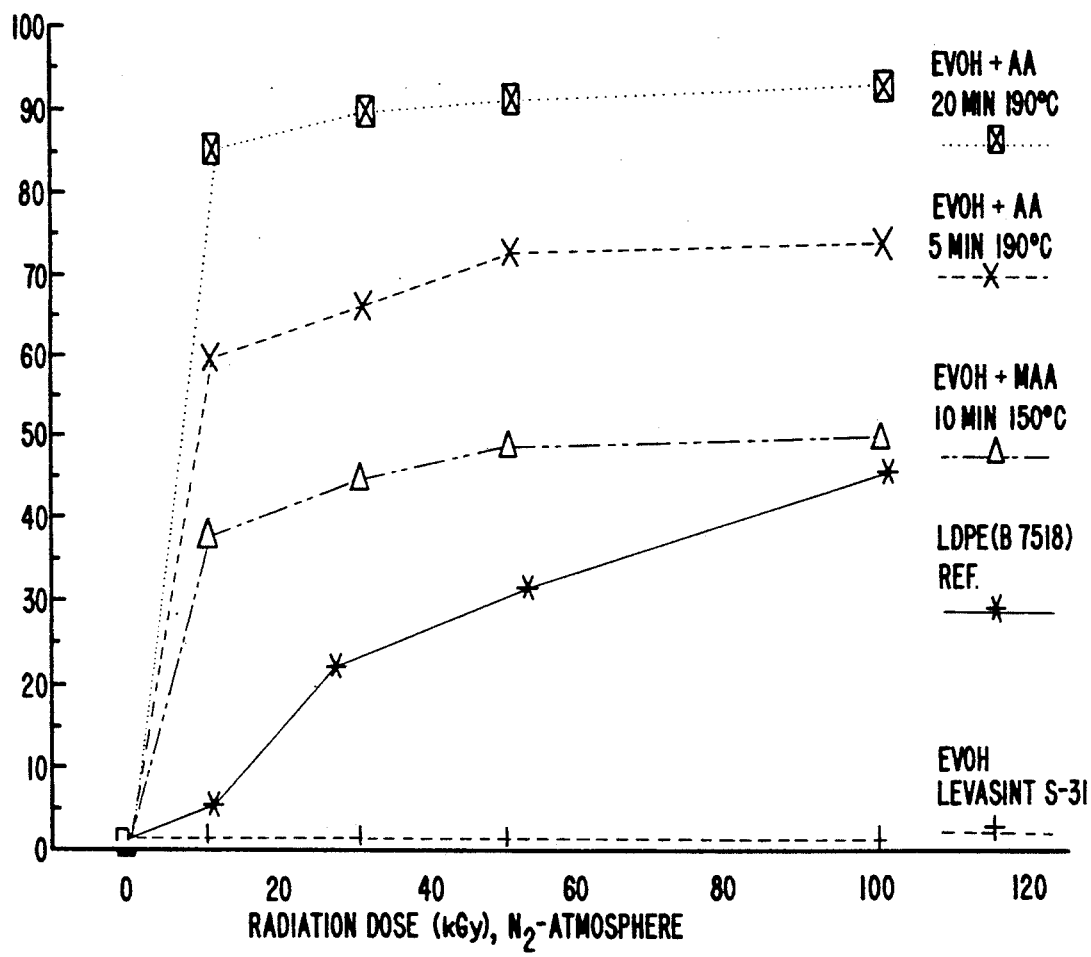
FIG. 1 is a graphic representation of degrees of cross-linking obtained, by radiation in accordance with Example 1 below.

6. The degree of cross-linkage was measured in accordance with the ASTM D2765 standard, except that no antioxidant was used, and the extraction time was extended to 24 hours. The degrees of cross-linkage obtained with 0, 10, 30, 50 and 100 kGy doses were 1%, 37.8%, 44.8%, 48.9% and 50%. Note FIG. 1.

7. The same procedure was followed as under 4-6 except that the material used was the material prepared under 2. The degrees of cross-linkage obtained with 0, 10, 30, 50, 100 kGy radiation doses were 1.1%, 60.6%, 66.3%; 72.8% and 74.1%. Note FIG. 1.

8. The same procedure was followed under 4-6 except that the raw-material used was the polymer prepared under 3 in Example 1. The degree of cross-linkage with 0, 10, 30, 50 and 100 kGy radiation doses were measured as 0.8, 85.5%, 89.9%, 91.3% and 93.0%. Note FIG. 1.

Cross-linking by Means of Peroxide

9. The cross-linking by means of peroxide was carried out by means of the Brabender by using 1% dicumylperoxide. The conditions were 180° C., 50 rpm and 5 minutes. The polymer prepared in this Example 1 under 2 was used for the cross-linking, whereby a degree of cross-linkage of 61.8% was obtained. The degree of cross-linkage of a non-esterified Levasint S-31 EVOH cross-linked in the same way was found to be as low as 1.2%.

EXAMPLE 2

Preparation of Polymer

1. The esterification was carried out in a toluene solution under acid conditions using as the starting material BAYER Levasint S-31 ethylene-vinyl-alcohol copolymer (EVOH) containing 16 percent by weight of vinylalcohol. The reactor used was a 1 liter glass vessel, into which 500 ml of toluene, 20 g of EVOH and a stoichiometric amount of methacrylic acid as well as 1% of hydroquinone, with respect to the quantity of acid, were added. the esterification was carried out in boiling toluene solution while using 1.5% by weight of Amberlyst 15 gel or 0.5 mole-% of tetrabutyltitanate as a catalyst. The reactor was provided with an agitator and with a reflux condenser. The reaction time was 2.5 hours. The polymer was separated from the solution by evaporating the toluene first in a fume cupboard over 12 h, and later in a vacuum incubator at 70° C.

Cross-linking

Figure 2:
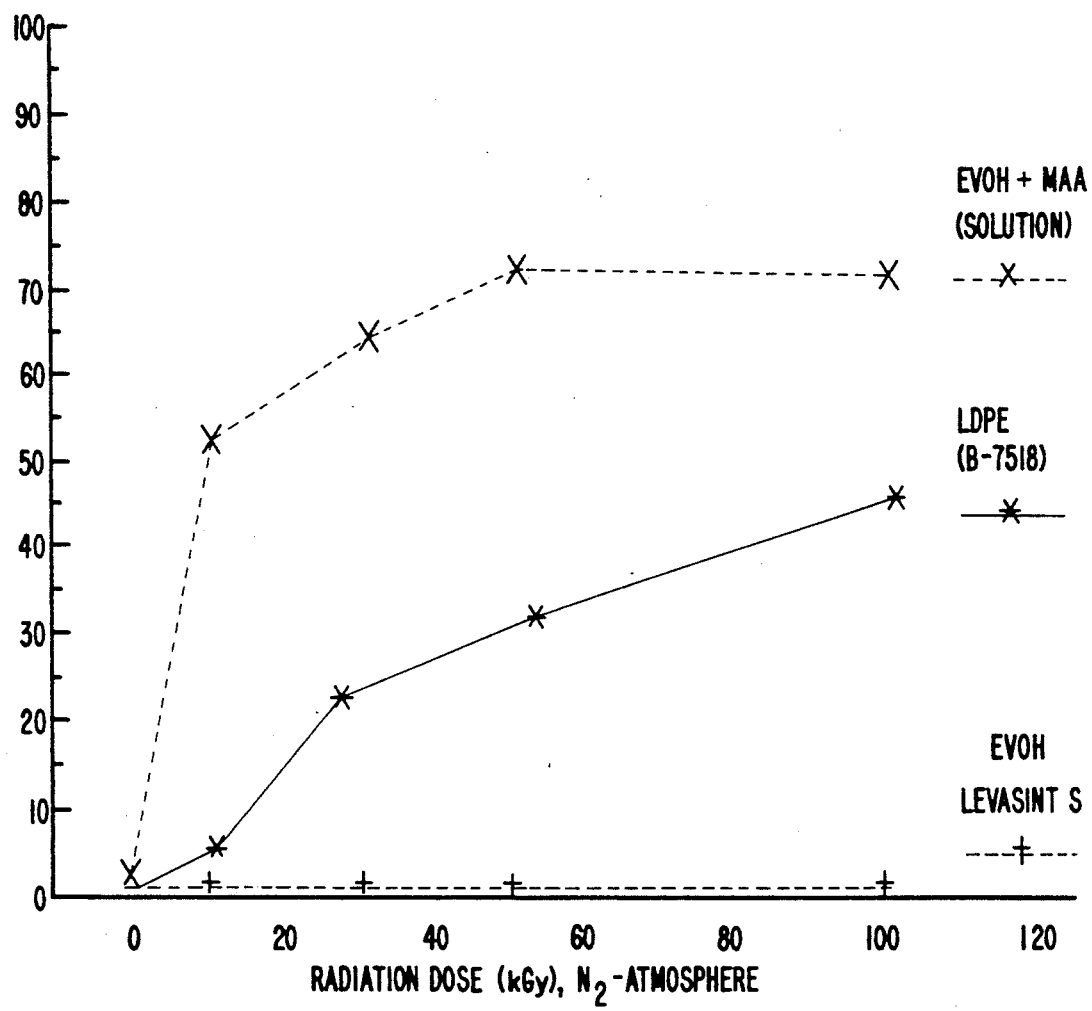
FIG. 2 is a graphic representation of degrees of cross-linking obtained in accordance with Example 2.

2. From the polymer prepared under 1, a film was produced and cross-linked in the same way as in Example 1 under 4-6. The degree of cross-linkage was found to be 52.6% with a radiation dose of 10 kGy, 64.2% with 30 kGy, and 72% with a radiation dose of 100 kGy. Note FIG. 2.

EXAMPLE 3

Preparation of Polymer

1. The ethylene-vinylalcohol copolymer was prepared by means of molten state hydrolysis of ethylene-vinylacetate copolymer, EVA. The EVA quality was B-2018 prepared by Neste Oy, whose melt index with weight of 2.16 kg is 2 g/10 min and whose vinylacetate content is 18%. The hydrolysis was carried out in the molten state with a Werner & Pfleider ZSK 30 twin-screw extruder by using 1.0% by weight of sodium methoxide as well as 15% by weight of methanol. The conditions of the extruder were: speed of rotation 100 rpm, temperature 160°-170° C., the temperature of the mix was 180°-185° C., time of dwell about 5 minutes, and output 2 kg per hour. The melt index of the final product was 1.8 g/10 min, and the composition as follows:
4% by weight of vinylalcohol
8% by weight of vinylacetate.
88% by weight of ethylene.

Esterification

2. The esterification was carried out in the molten state by means of a Brabender by using the polymer prepared under 1 and a stoichiometric amount of methacrylic acid. The conditions were 150° C., 50 rpm and 19 minutes. The melt index of the polymer with a weight of 2.16 kg was 1.4 g/10 min.

3. The same procedure was applied as under 2, except that 0.5 mole-% of tetrabutyltitanate was used as a catalyst. The melting index of the polymer with a weight of 21.6 kg was 5.9 g/10 min.

4. The same procedure was applied as under 3, except that the esterification was carried out at 180° C. over 10 minutes, and acrylic acid was used instead of methacrylic acid.

Cross-linking

Figure 3:
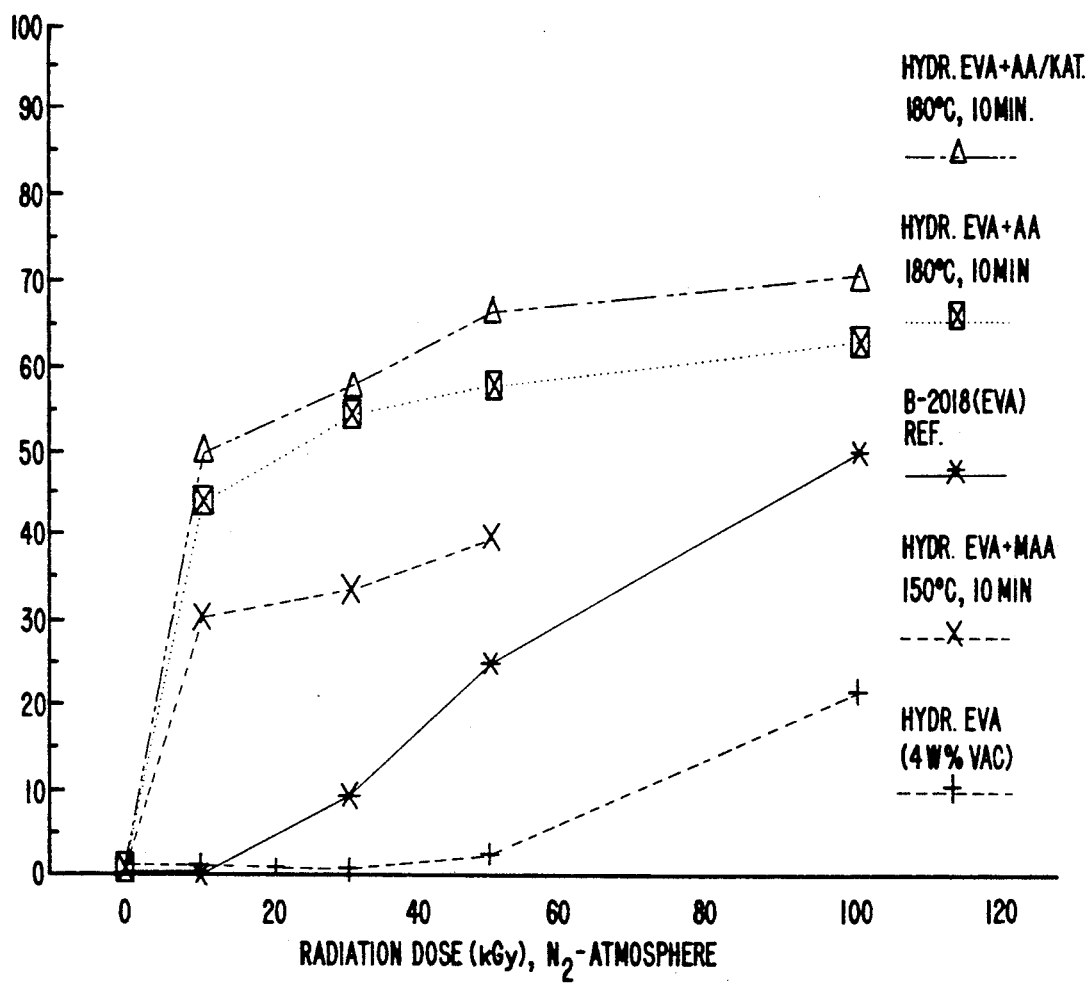
FIG. 3 is a graphic representation of degrees of cross-linking obtained in accordance with Example 3.
Figure 4:
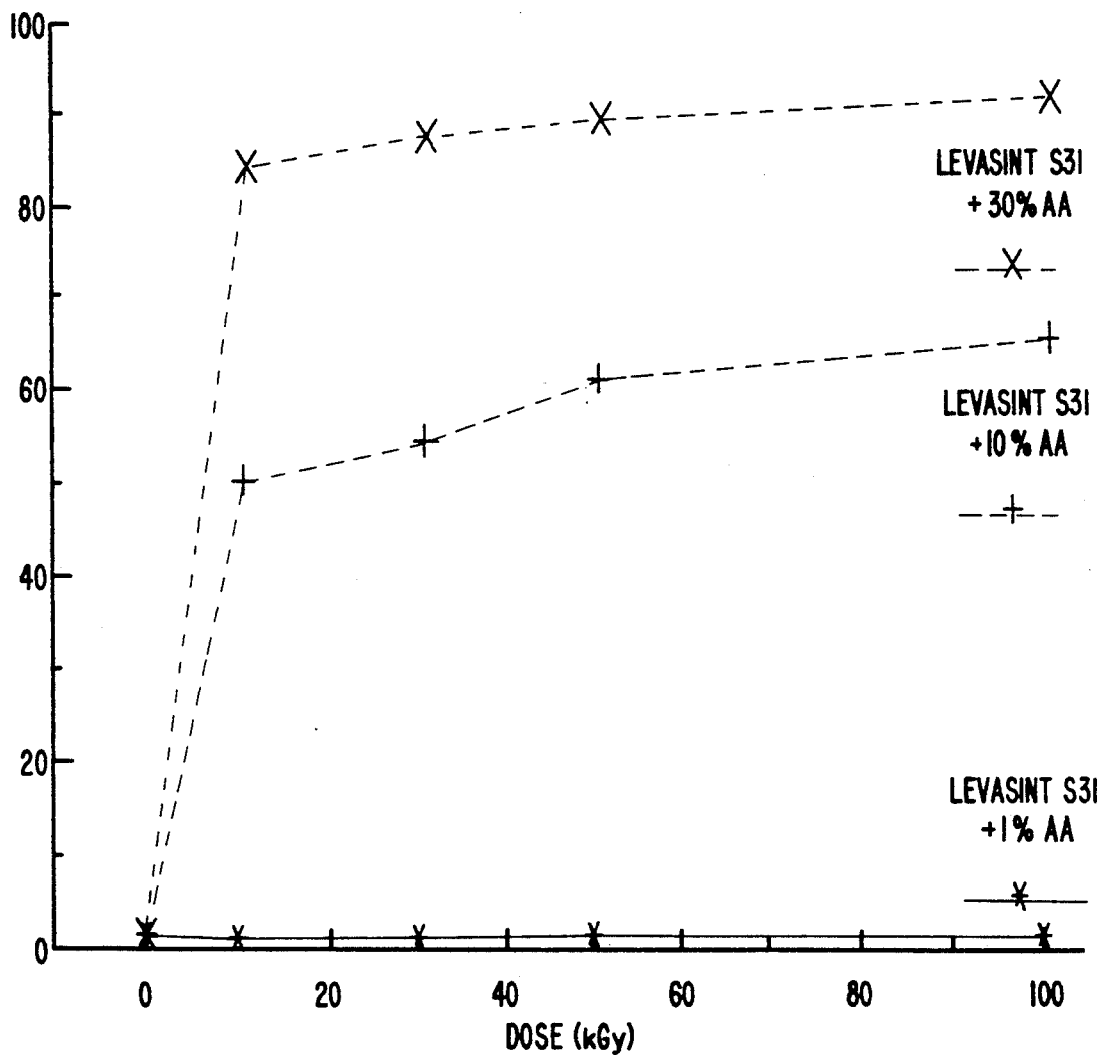
FIG. 4 is a graphic representation of the degree of cross-linkage on the amount of acrylic acid added.

5. The polymer prepared under 2 was used as the raw-material, in the other respects the procedure was the same as in Example 1 under 3-5. In this case, with radiation doses of 0, 10, 30, 50 kGy, the degrees of cross-linkage obtained were 1.1%, 22.7%, 30.3% and 35.8%. Note FIG. 3.

6. The polymer prepared under 4 was used as the raw-material in the other respects the procedure was the same as in Example 1 under 3-5. In this case, with radiation doses of 0, 10, 30, 50, 100 kGy, the degrees of cross-linkage obtained were 0.8%, 44.1%, 53%, 54.3% and 62.9%. Note FIG. 3.

EXAMPLE 4

1. Ethylene-vinylalcohol copolymer (Kuraray EP-E) with 66 mole-% of vinyl-alcohol was esterified with about 10% by weight of acrylic acid. The esterification was carried out with a Brabender Plasticorder Ple 651 mixer at 180° C. over 10 minutes. For mixing, a 30 cm³ mixer head was used, to which 27 g of Kuraray EP-E and 3 g of acrylic acid were added.

2. From the starting material (Kuraray EP-E) and the esterified product, an about 100 μm thick film was prepared by compression moulding at 190° C. by means of a Fontijne extruder.

3. The compression-moulded films were irradiated with doses of 0, 10, 30, 50, and 100 kGy by means of an Electrocurtain electron accelerator. The irradiation was carried out in a nitrogen atmosphere with an oxygen content of about 150 ppm. The accelerator voltage was 175 kV.

4. The degree of cross-linkage was determined by extracting a sample in boiling dimethylsulfoxide (DMSO) for 4 hours.

Figure 5:
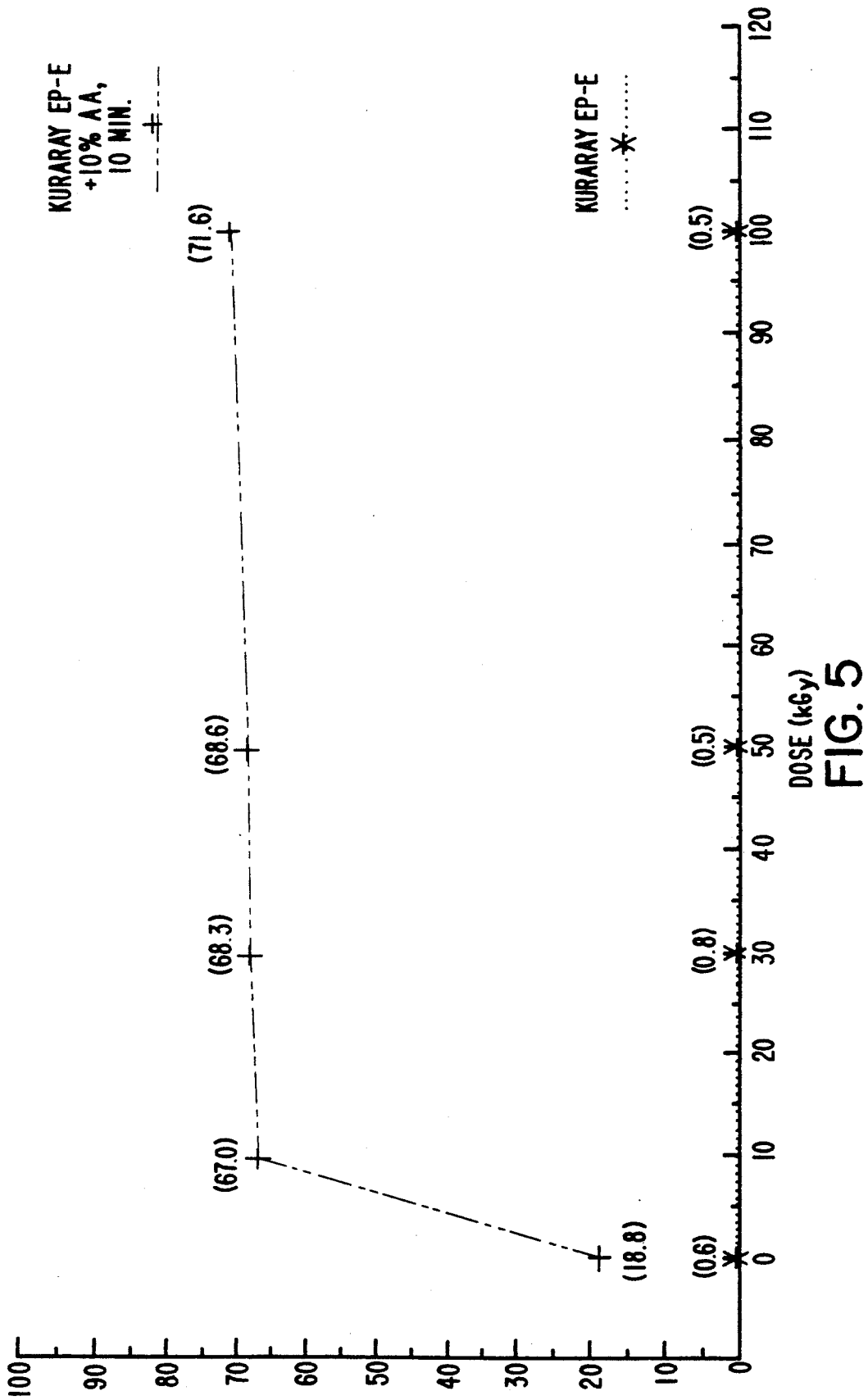
FIG. 5 is a graphic representation of the degree of cross-linkage of Kuraray EP-E and of Kararay EP-E esterified with acrylic acid.

5. The degrees of cross-linkage of Kuraray EP-E and of a Kuraray EP-E esterified with 10% acrylic acid are given in FIG. 5.

EXAMPLE 5

1. Ethylene-vinylalcohol copolymer (Moviol 4-98) containing 98 mole-% of vinylalcohol was esterified with about 10% by weight of acrylic acid. The esterification was carried out by means of a Brabender Plasticorder Ple 651 mixer at 230° C. for 5 minutes. For mixing, a mixer head of 30 cm³ was used, into which 27 g of Moviol 4-98 and 3 g of acrylic acid were added.

2. The esterified Moviol 4-98 was cross-linked by compression-moulding a sample at 250° C. The compression pressure was 150 kN and the time was 5 minutes. The thickness of the compression-moulded film was about 100 μm. As a reference, a film was prepared in the same way from the starting material Moviol 4-98.

3. The compression-moulded films were irradiated with doses of 0, 10, 30, 50 and 100 kGy by means of an Electrocurtain electron accelerator. The irradiation was carried out in a nitrogen atmosphere with an oxygen content of about 150 ppm. The accelerator voltage was 175 kV. By means of irradiation, the degree of cross-linkage can be increased by about 5%. The major part of the acrylic double bonds react by the effect of heat on the compression-moulding stage.

Figure 6:
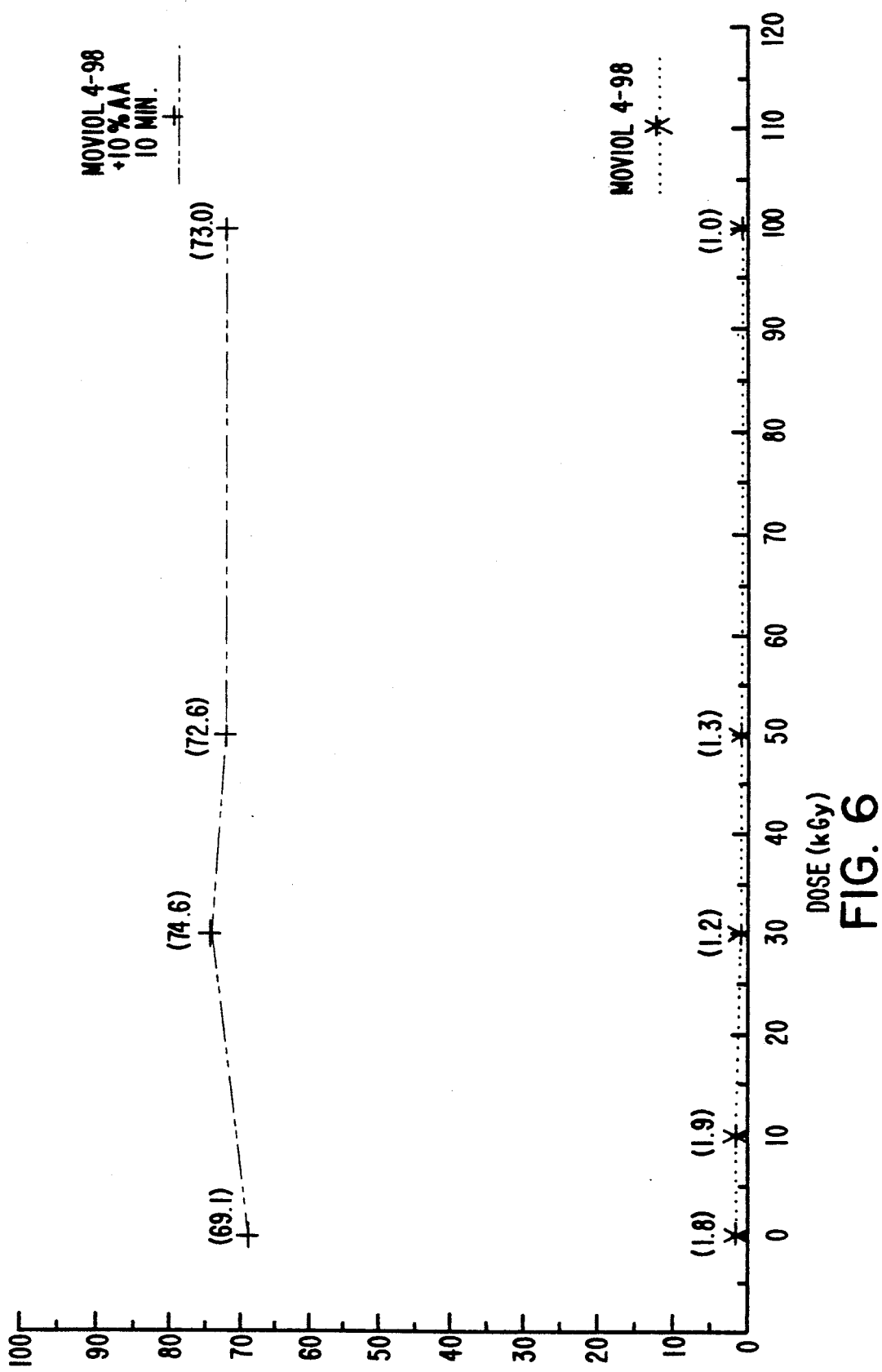
FIG. 6 is a graphic representation of the degree of cross-linkage of Moviol 4-98 and Moviol 4-98 esterified with acrylic acid.

4. The degree of cross-linkage was determined by extracting a sample in boiling water over 3 hours. The degree of cross-linkage of the Moviol 4-98 starting material was about 1% and that of the product esterified by means of acrylic acid about 69%. Note FIG. 6.

While the invention has been illustrated with respect to the particular embodiments, it is apparent that variations and modifications of the invention can be made and these variations and modifications are meant to be comprehended within the scope of the appended claims.

What is claimed is:

1. Copolymer of ethylene, vinyl alcohol and vinyl acetate, said co- or ter-polymer containing pendant unsaturated acrylate groups and being cross-linkable by ionizing radiation or chemically by peroxides.

2. Polymer according to claim 1 which is the esterification product of ethylene-vinyl alcohol copolymer and an unsaturated organic carboxylic acid.

3. Polymer according to claim 2 wherein said organic carboxylic acid is acrylic acid.

4. Polymer according to claim 2 wherein said unsaturated organic carboxylic acid is methacrylic acid.

5. Polymer according to claim 1 which is the esterification product of an ethylene-vinylacetate copolymer and an unsaturated organic carboxylic acid.

6. Ethylene-vinylalcohol copolymer of claim 2 containing 1-100% by weight of vinyl alcohol and being the product of hydrolyzation of ethylene-vinylacetate copolymer.

* * * * *